US010705854B2

(12) United States Patent
Stone et al.

(10) Patent No.: US 10,705,854 B2
(45) Date of Patent: Jul. 7, 2020

(54) OPTIMIZED USER INTERFACE DELIVERY (71) Applicant: COMCAST CABLE COMMUNICATIONS, LLC, Philadelphia, PA (US)

(72) Inventors: Christopher Stone, Newtown, PA (US); Frances Bevan, Voorhees, NJ (US); Michael Rekstad, Langhorne, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 683 days.

(21) Appl. No.: 13/804,849

(22) Filed: Mar. 14, 2013

(65) Prior Publication Data
US 2014/0282052 A1 Sep. 18, 2014

(51) Int. Cl.
G06F 3/048 (2013.01)
G06F 9/445 (2018.01)
G06F 9/451 (2018.01)

(52) U.S. Cl.
CPC .......... G06F 9/44505 (2013.01); G06F 9/451 (2018.02)

(58) Field of Classification Search
CPC ....................................................... G06F 3/0481
USPC ............................................................ 725/39
See application file for complete search history.

(56) References Cited

U.S. PATENT DOCUMENTS

| 7,091,968 B1* | 8/2006 | Ludvig et al. ................... 725/39 |
| 7,814,512 B2* | 10/2010 | Wasserman ........ H04N 5/44543 725/46 |
| 8,650,601 B2* | 2/2014 | Allegrezza et al. ............ 725/93 |
| 8,832,184 B1* | 9/2014 | Britto ...................... G06F 9/542 709/203 |
| 2011/0296474 A1* | 12/2011 | Babic ............................. 725/87 |

* cited by examiner

Primary Examiner — Mohamed Abou El Seoud
(74) Attorney, Agent, or Firm — Banner & Witcoff, Ltd.

(57) ABSTRACT

Multiple User Interface (UI) states may be identified and encoded into encoded UI states. Each of the encoded UI states may comprise an image of one or more of the UI states and metadata associating the encoded UI state with one or more other encoded UI states that comprise an image of a UI state that is navigationally related to one or more of the UI states encoded in the encoded UI state. A portion of the encoded UI states may be communicated to one or more user devices.

18 Claims, 10 Drawing Sheets

OPTIMIZED USER INTERFACE DELIVERY

BACKGROUND

User Interfaces (UIs) are delivered to devices as part of a wide range of applications. For example, on-screen program guides, program listings, and on-demand program interfaces are utilized by content providers to assist users in navigating and selecting available programming options. The generation and delivery of UIs, however, is often a resource-intensive endeavor. Delays associated with generating and delivering UIs to user devices can result in sluggish performance and diminish the quality of the end user's experience. Because the resources available for generating and communicating UIs are limited, there remains an ever-present need to conserve these resources, especially when generating and delivering resource-intensive UIs.

SUMMARY

In accordance with one or more aspects of the disclosure, various possible states of a UI application (e.g., constituent screens, aspects, or views of the UI) may be identified. The identified UI states may include many, or all, possible states that a particular UI application may present to a user. The identified UI states may be encoded into encoded UI states. For example, the UI states may be encoded into one or more static images and/or one or more video clips. These encoded UI states may be communicated to one or more user devices and/or pushed to one or more edge caches associated with the user devices.

In some embodiments, the encoded UI states may include metadata associating each encoded UI state with one or more other navigationally related encoded UI states. For example, an encoded UI state may include metadata associating it with another encoded UI state that may be displayed if a user navigates right, left, up, or down on the encoded UI state. Additionally or alternatively, an encoded UI state may include metadata associating it with another encoded UI state that may be displayed if a user selects an option on the encoded UI state and/or if a user indicates a desire to view the encoded UI state displayed immediately preceding the encoded UI state.

In some embodiments, multiple encoded UI states may be communicated to a user device and/or pushed to an edge cache associated with a user device prior to the user device requesting the UI states encoded therein. For example, an encoded UI state and one or more additional encoded UI states associated with the encoded UI state by metadata of the encoded UI state may be communicated to the user device and/or pushed to an edge cache associated with the user device.

In some embodiments, a first portion of the encoded UI states may be communicated or pushed to a first edge cache associated with a first portion of user devices, and a second portion of the encoded UI states may be communicated or pushed to a second edge cache associated with a second portion of user devices. The first portion of encoded UI states may include one or more encoded UI states and/or one or more additional encoded UI states that are navigationally related to the one or more encoded UI states. The second portion of encoded UI states may include one or more other encoded UI states and/or one or more additional encoded UI states that are navigationally related to the one or more other encoded UI states.

This summary is not intended to identify critical or essential features of the disclosure, but merely to summarize certain features and variations thereof. Other details and features will be described in the sections that follow.

BRIEF DESCRIPTION OF THE DRAWINGS

Some features herein are illustrated by way of example, and not by way of limitation, in the figures of the accompanying drawings, in which like reference numerals refer to similar elements, and in which.

DETAILED DESCRIPTION

Figure 1:
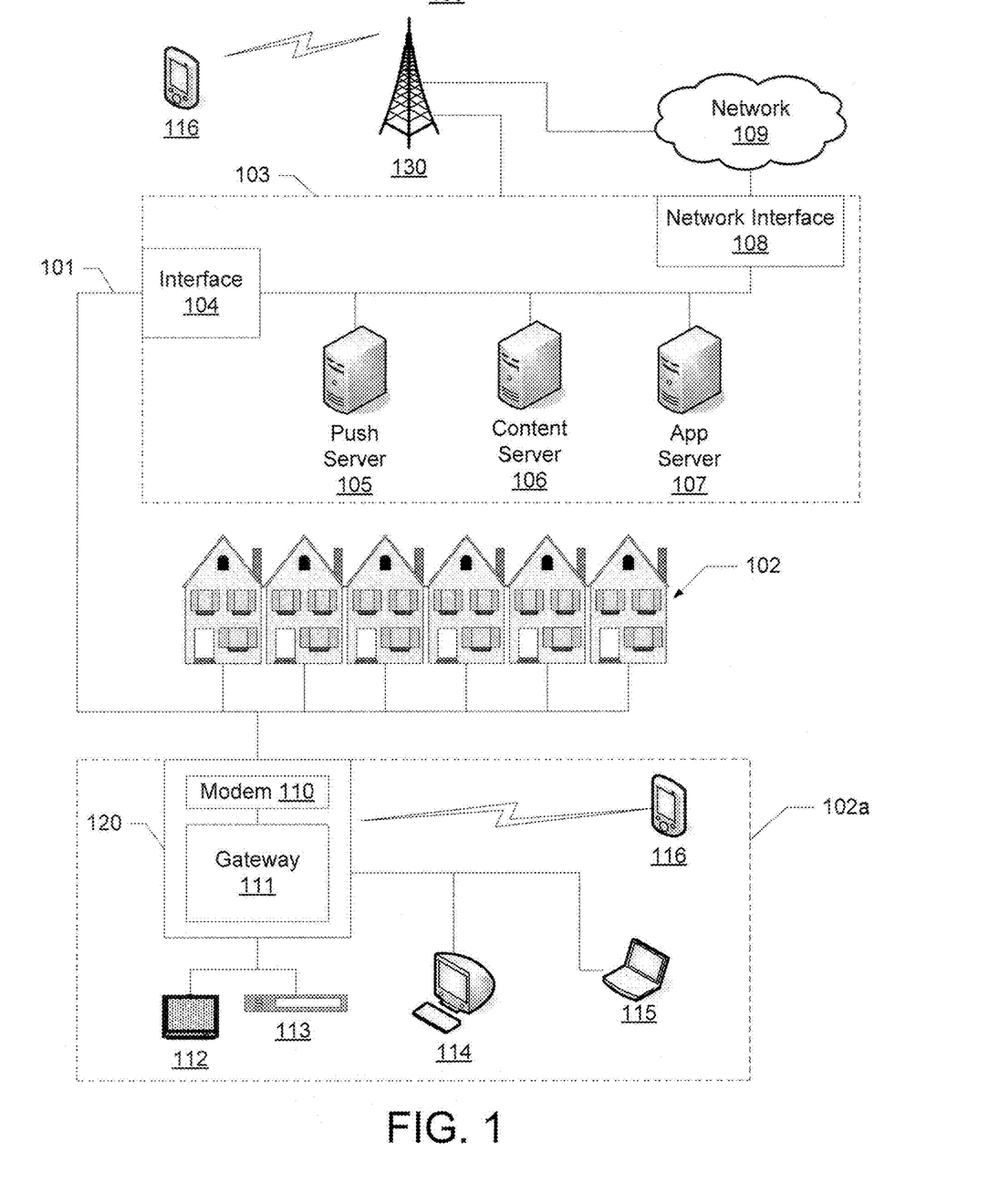
FIG. 1 depicts an illustrative network environment in which one or more aspects of the disclosure may be implemented.

FIG. 1 illustrates an example information distribution network 100 in which one or more of the various features described herein may be implemented. The illustrated information distribution network is only one example of a network and is not intended to suggest any limitation as to the scope of use or functionality of the disclosure. The illustrated network should not be interpreted as having any dependency or requirement relating to any component or combination of components in an information distribution network.

Network 100 may be a telecommunications network, a Multi-Service Operator (MSO) network, a cable television (CATV) network, a cellular network, a wireless network, an optical fiber network, a coaxial cable network, a Hybrid Fiber-Coaxial (HFC) network, or any other type of information distribution network or combination of networks. For example, network 100 may be a cellular broadband network communicating with multiple communications access points, such as wireless communications tower 130. In another example, network 100 may be a coaxial system comprising a Cable Modem Termination System (CMTS) communicating with numerous gateway interface devices (e.g., gateway interface device 111 in example home 102a). In another example, the network 100 may be a fiber-optic system comprising optical fibers extending from an Optical Line Terminal (OLT) to numerous Optical Network Terminals (ONTs) communicatively coupled with various gateway interface devices. In another example, the network 100 may be a Digital Subscriber Line (DSL) system that includes local office 103 communicating with numerous gateway interface devices. In another example, network 100 may be an HFC network in which Internet traffic is routed over both optical and coaxial communication paths to a gateway interface device in or near a user's home. Various aspects of the disclosure may operate on one or more of the networks described herein or any other network architectures now known or later developed.

Network 100 may use a series of interconnected communication links 101 (e.g., coaxial cables, optical fibers, wireless links, etc.) to connect premises 102 (e.g., a home or other user environment) to local office 103. Communication links 101 may include any wired communication links, wireless communication links, communications networks, or combinations thereof. For example, portions of communication links 101 may be implemented with fiber-optic cable, while other portions of communication links 101 may be implemented with coaxial cable. Communication links 101 may also include various communications components such as splitters, filters, amplifiers, wireless components, and other components for communicating data. Data may include, for example, Internet data, voice data, weather data, media content, and any other information. Media content may include, for example, video content, audio content, media on demand, video on demand, streaming video, television programs, text listings, graphics, advertisements, and other content. A media content item may represent an individual piece of media content, such as a particular movie, television episode, online video clip, song, audio recording, image, or any other data. In some instances, a media content item may be fragmented into segments, such as a plurality of two-second video fragments that may be separately addressed and retrieved.

Local office 103 may transmit downstream information signals onto communication links 101, and one or more of premises 102 may receive and process those signals. In certain implementations, communication links 101 may originate from local office 103 as a single communications path, and may be split into any number of communication links to distribute data to premises 102 and various other destinations. Although the term premises is used by way of example, premises 102 may include any type of user environment, such as single family homes, apartment complexes, businesses, schools, hospitals, parks, and other environments and combinations of environments.

Local office 103 may include interface 104, which may be a computing device configured to manage communications between devices on the network of communication links 101 and backend devices, such as server 105, server 106, and server 107. For example, interface 104 may be a CMTS. The termination system may be as specified in a standard, such as, in an example of an HFC-type network, the Data Over Cable Service Interface Specification (DOCSIS) standard, published by Cable Television Laboratories, Inc. The termination system may be configured to transmit data over one or more downstream channels or frequencies to be received by various devices, such as modems in premises 102, and to receive upstream communications from those modems on one or more upstream frequencies.

Local office 103 may include one or more network interfaces 108 for communicating with one or more external networks 109. One or more external networks 109 may include, for example, one or more telecommunications networks, Internet Protocol (IP) networks, cellular communications networks (e.g., Global System for Mobile Communications (GSM), Code Division Multiple Access (CDMA), and any other 2nd, 3rd, 4th, or higher generation cellular communications networks), cellular broadband networks, radio access networks, fiber-optic networks, local wireless networks (e.g., Wi-Fi, WiMAX), satellite networks, and any other networks or combinations of networks.

Local office 103 may include a variety of servers that may be configured to perform various functions. Local office 103 may include one or more push servers 105 for generating push notifications to deliver data, instructions, or both to devices that are configured to detect such notifications. Local office 103 may include one or more content servers 106 configured to provide content (e.g., media content) to devices. Local office 103 may also include one or more application servers 107.

Premises 102, such as home 102a, may include an interface 120, which may include device 110, for communicating on communication links 101 with local office 103, one or more external networks 109, or both. For example, device 110 may be a coaxial cable modem (for coaxial cable links 101), a broadband modem (for DSL links 101), a fiber interface node (for fiber-optic links 101), or any other device or combination of devices. In certain implementations, device 110 may be a part of, or communicatively coupled to, gateway interface device 111. Gateway 111 may be, for example, a wireless router, a set-top box, a computer server, or any other computing device or combination.

Gateway interface device 111 may be any computing device for communicating with device 110 to allow one or more other devices in example home 102a to communicate with local office 103, one or more external networks 109, or other devices communicatively coupled thereto. Gateway 111 may include local network interfaces to provide communication signals to client devices in or near example home 102a, such as television 112, set-top box 113, personal computer 114, laptop computer 115, wireless device 116 (e.g., a wireless laptop, a tablet computer, a mobile phone, a portable gaming device), vehicular computing system 117 (e.g., a mobile computing system, navigation system, or entertainment system in an automobile, marine vessel, aircraft, or the like) and any other device.

Figure 2:
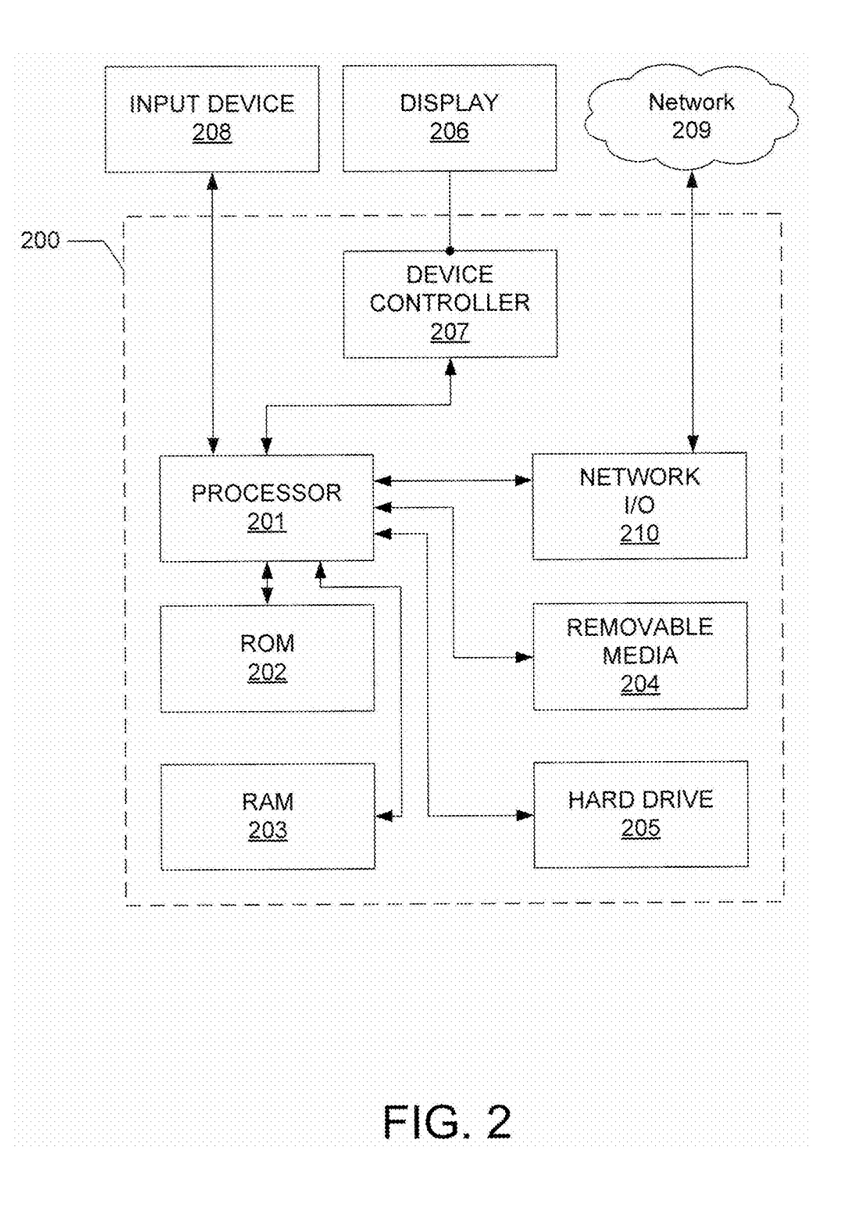
FIG. 2 depicts an illustrative software and hardware device on which various aspects of the disclosure may be implemented.

FIG. 2 illustrates general hardware elements and software elements that can be used to implement any of the various computing devices, servers, encoders, caches, and/or software discussed herein. Device 200 may include one or more processors 201, which may execute instructions of a computer program to perform any of the functions and steps described herein. The instructions may be stored in any type of computer-readable medium or memory to configure the operation of the processor 201. For example, instructions may be stored in a Read-Only Memory (ROM) 202, Random Access Memory (RAM) 203, removable media 204, such as a Universal Serial Bus (USB) drive, Compact Disk (CD) or Digital Versatile Disk (DVD), hard drive, floppy disk, or any other desired electronic storage medium. Instructions may also be stored in hard drive 205, which may be an internal or external hard drive.

Device 200 may include one or more output devices, such as display 206 (e.g., an integrated or external display, monitor, or television), and may include one or more output device controllers 207, such as a video processor. In some embodiments, device 200 may include one or more user input devices 208, such as a remote control, keyboard, mouse, touch screen, microphone, motion sensing input device, and/or any other input device.

Device 200 may also include one or more network interfaces, such as network Input/Output (I/O) interface 210 to communicate with external network 209. The network interface may be a wired interface, wireless interface, or a combination of the two. In some embodiments, network I/O interface 210 may include a cable modem, and network 209 may include communication links 101 shown in FIG. 1, one or more external networks 109, an in-home network, a provider's wireless, coaxial, fiber, or hybrid fiber/coaxial distribution system (e.g., a DOCSIS network), and/or any other desired network.

Figure 3:
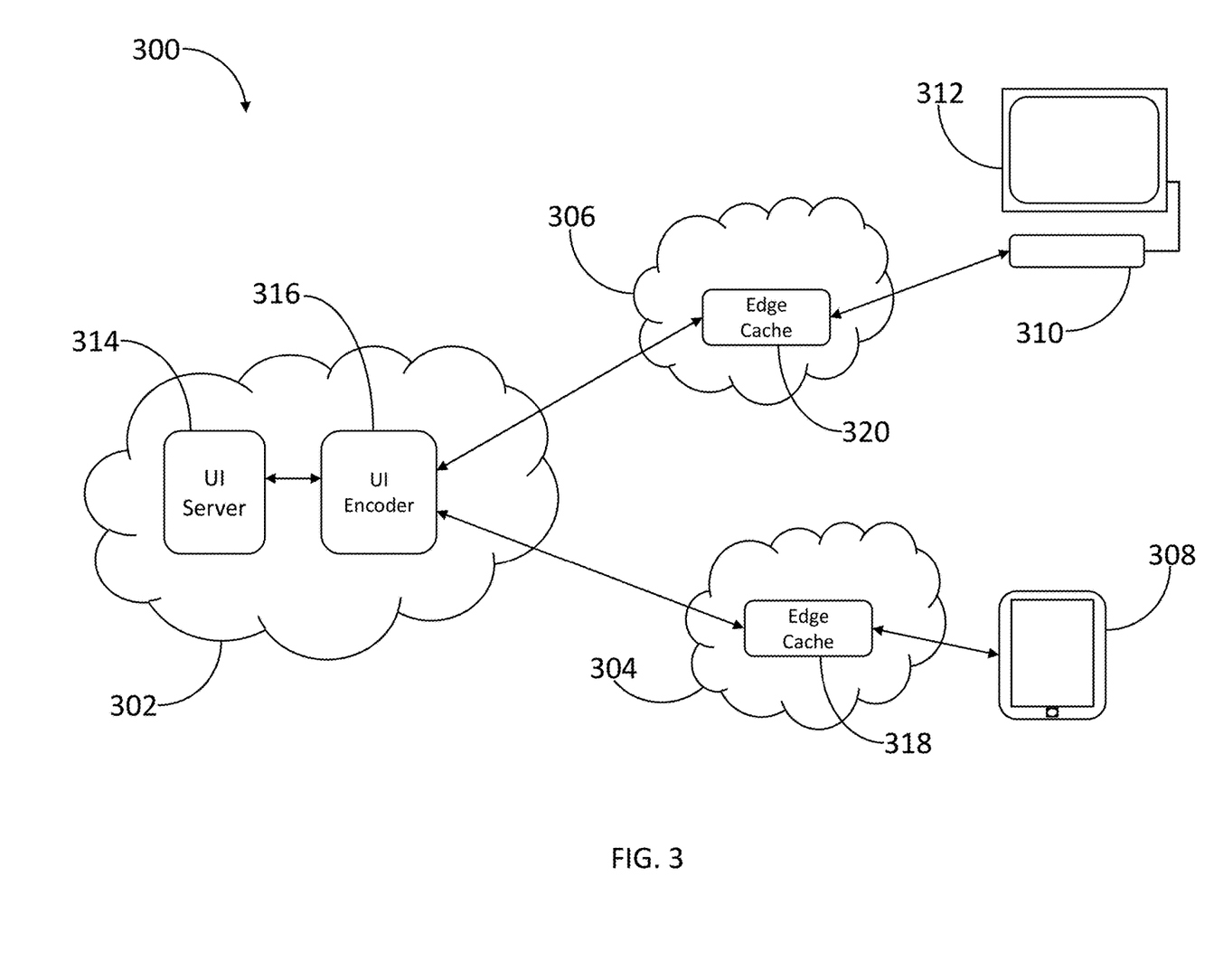
FIG. 3 depicts an illustrative network environment for employing systems and methods in accordance with one or more aspects of the disclosure.

FIG. 3 depicts an illustrative network environment for employing systems and methods in accordance with one or more aspects of the disclosure. Referring to FIG. 3, network environment 300 may include one or more networks. For example, network environment 300 may include provider network 302 and access networks 304 and 306. Network environment 300 may also include one or more user devices. For example, network environment 300 may include user devices 308 and 310. User devices 308 and 310 may be any device configured to render an image or video for display (e.g., a television, set-top box, digital video recorder, desktop computer, laptop computer, tablet computer, smart phone, etc.). For example, user device 308 may be a tablet computer, and user device 310 may be a set-top box, which may be associated with television 312. User device 308 and/or user device 310 may be configured to receive one or more data streams containing video or images for display. For example, user device 308 and/or user device 310 may receive one or more data streams via access networks 304 and 306, respectively. Data streams communicated to user device 308 and/or user device 310 may include one or more images and/or video, which user device 308 and/or user device 310 may render for display.

Provider network 302 may include one or more UI servers. For example, provider network 302 may include UI server 314. UI server 314 may be part of an on-demand video service and/or networked Digital Video Recorder (nDVR) service, and may provide one or more UI states of a UI application (e.g., program listing screens, linear program information screens or dialogs, recording interface screens, help screens, setting screens, information screens, etc.) to users who wish to peruse program listings and select programs for viewing and/or remote recording. Provider network 302 may also include one or more UI encoders. For example, provider network 302 may include UI encoder 316. UI encoder 316 may receive one or more UI states (e.g., from UI server 314) and may encode the UI states (e.g., into one or more static images and/or video clips). Access network 304 and/or access network 306 may include one or more edge caches. For example, access network 304 may include edge cache 318. Similarly, access network 306 may include edge cache 320. Edge caches 318 and 320 may be configured to receive data (e.g., encoded UI states) from provider network 302, temporarily store the received data, and subsequently communicate the data to one or more user devices (e.g., user devices 308 and 310). Any of user device 308, user device 310, UI server 314, UI encoder 316, edge cache 318, and/or edge cache 320 may include one or more hardware and/or software elements for implementing one or more of the functions described herein. For example, user device 308, user device 310, UI server 314, UI encoder 316, edge cache 318, and/or edge cache 320 may include one or more of the hardware and/or software elements discussed above with respect to FIG. 2.

As will be described in greater detail below, in accordance with one or more aspects of the disclosure, UI server 314 may identify and generate multiple UI states prior to user device 308 or user device 310 requesting them. UI encoder 316 may encode the UI states generated by UI server 314. For example, the UI states may be encoded into one or more static images and/or one or more video clips. These encoded UI states may then be communicated to user device 308 and/or user device 310, and/or pushed to edge cache 318 and/or edge cache 320. In some embodiments, multiple encoded UI states may be communicated to user device 308 and/or user device 310, and/or pushed to edge cache 318 and/or edge cache 320 prior to user device 308 or user device 310 requesting the UI states encoded therein. For example, an encoded UI state and one or more additional encoded UI states associated with the encoded UI state by metadata of the encoded UI state may be communicated to user device 308 and/or user device 310, and/or pushed to edge cache 318 and/or edge cache 320.

Figure 4:
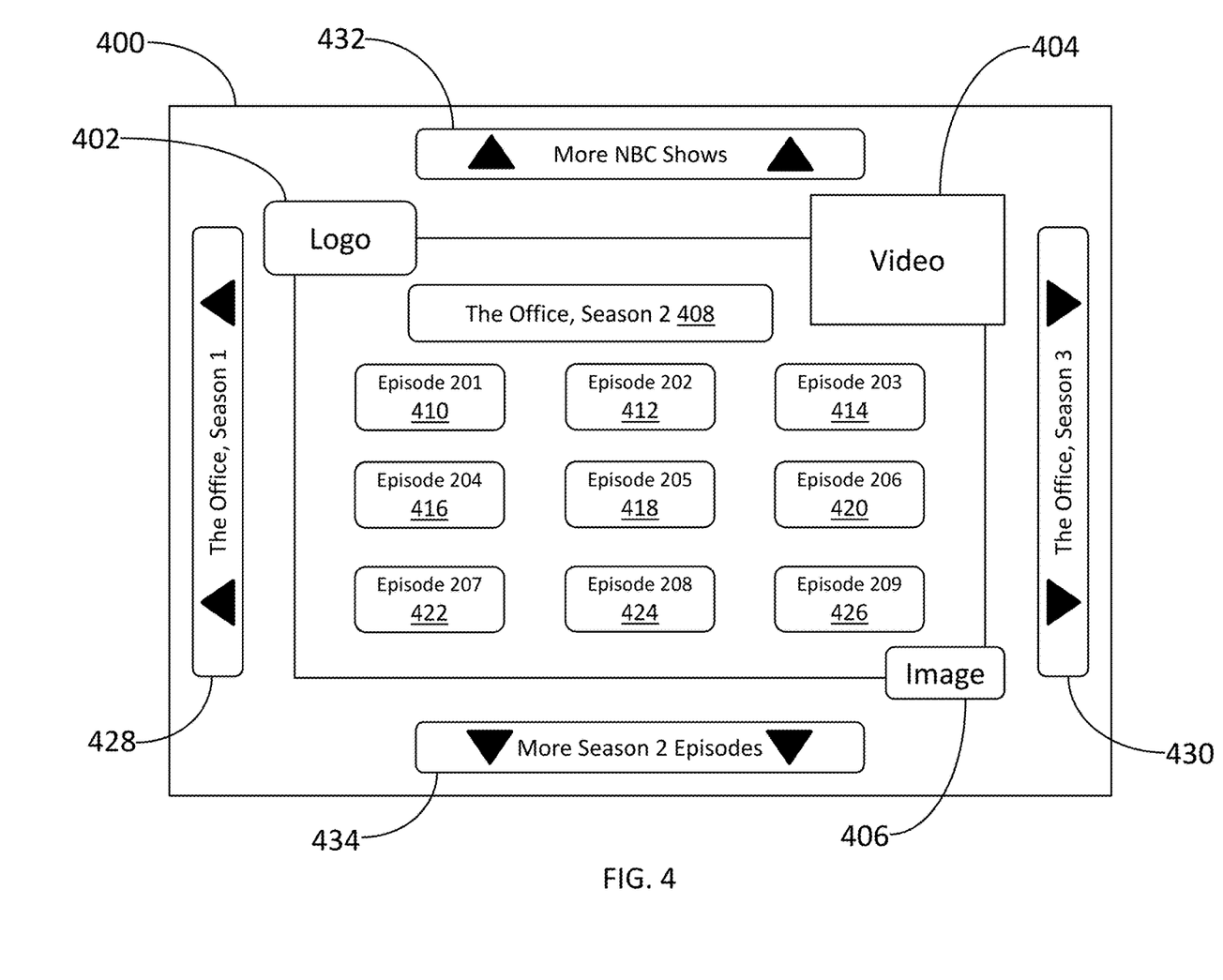
FIG. 4 depicts an illustrative UI state in accordance with one or more aspects of the disclosure.

FIG. 4 depicts an illustrative UI state in accordance with one or more aspects of the disclosure. Referring to FIG. 4, UI state 400 may include a program listing or program guide (e.g., for selecting a program for on-demand viewing and/or nDVR remote recording). UI state 400 may include one or more elements. For example, UI state 400 may include logo 402, embedded video 404, and/or image 406. UI state 400 may also include one or more selectable elements. For example, UI state 400 may include selectable elements 408, 410, 412, 414, 416, 418, 420, 422, 424, 426, 428, 430, 432, and/or 434. One or more of selectable elements 408, 410, 412, 414, 416, 418, 420, 422, 424, 426, 428, 430, 432, and/or 434 may be interactive graphical items, such as buttons, and may correspond to one or more programs and/or program groups (e.g., for on-demand viewing and/or nDVR recording). For example, selectable element 408 may correspond to the program group "The Office, Season 2." Similarly, selectable element 410 may correspond to program episode 201 of "The Office, Season 2"; selectable element 412 may correspond to program episode 202 of "The Office, Season 2"; selectable element 414 may correspond to program episode 203 of "The Office, Season 2"; selectable element 416 may correspond to program episode 204 of "The Office, Season 2"; selectable element 418 may correspond to program episode 205 of "The Office, Season 2"; selectable element 420 may correspond to program episode 206 of "The Office, Season 2"; selectable element 422 may correspond to program episode 207 of "The Office, Season 2"; selectable element 424 may correspond to program episode 208 of "The Office, Season 2"; and selectable element 426 may correspond to program episode 209 of "The Office, Season 2."

One or more of selectable elements 408, 410, 412, 414, 416, 418, 420, 422, 424, 426, 428, 430, 432, and/or 434 may correspond to one or more navigation options. For example, selectable element 428 may correspond to a navigation element that is invoked when the user navigates left (e.g., via a remote control) and may, when invoked by the user, provide the user with one or more additional UI states and/or additional selectable elements (e.g., one or more UI states associated with the program group "The Office, Season 1"). Similarly, selectable element 430 may correspond to a navigation element that is invoked when the user navigates right and may, when invoked by the user, provide the user with one or more additional UI states and/or additional selectable elements (e.g., one or more UI states associated with the program group "The Office, Season 3"); selectable element 432 may correspond to a navigation element that is invoked when the user navigates up and may, when invoked by the user, provide the user with one or more additional UI states and/or additional selectable elements (e.g., one or more UI states associated with "More NBC Shows"); and selectable element 434 may correspond to a navigation element that is invoked when the user navigates down and may, when invoked by the user, provide the user with one or more additional UI states and/or additional selectable elements (e.g., one or more selectable elements associated with more episodes of the program group "The Office, Season 2"). It will be appreciated, that one or more of selectable elements 408, 410, 412, 414, 416, 418, 420, 422, 424, 426, 428, 430, 432, and/or 434 may not be a visible element of UI state 400. For example, selectable element 428, selectable element 430, selectable element 432, and/or selectable element 434 may not be a visible element of UI state 400 and may be known by a user to exist through intuition and/or experience. Similarly, a user may be able to navigate to a UI state and/or one or selectable elements displayed immediately prior to UI state 400 by invoking an option (e.g., previous or last), for example, via a remote control or similar device.

Figure 5:
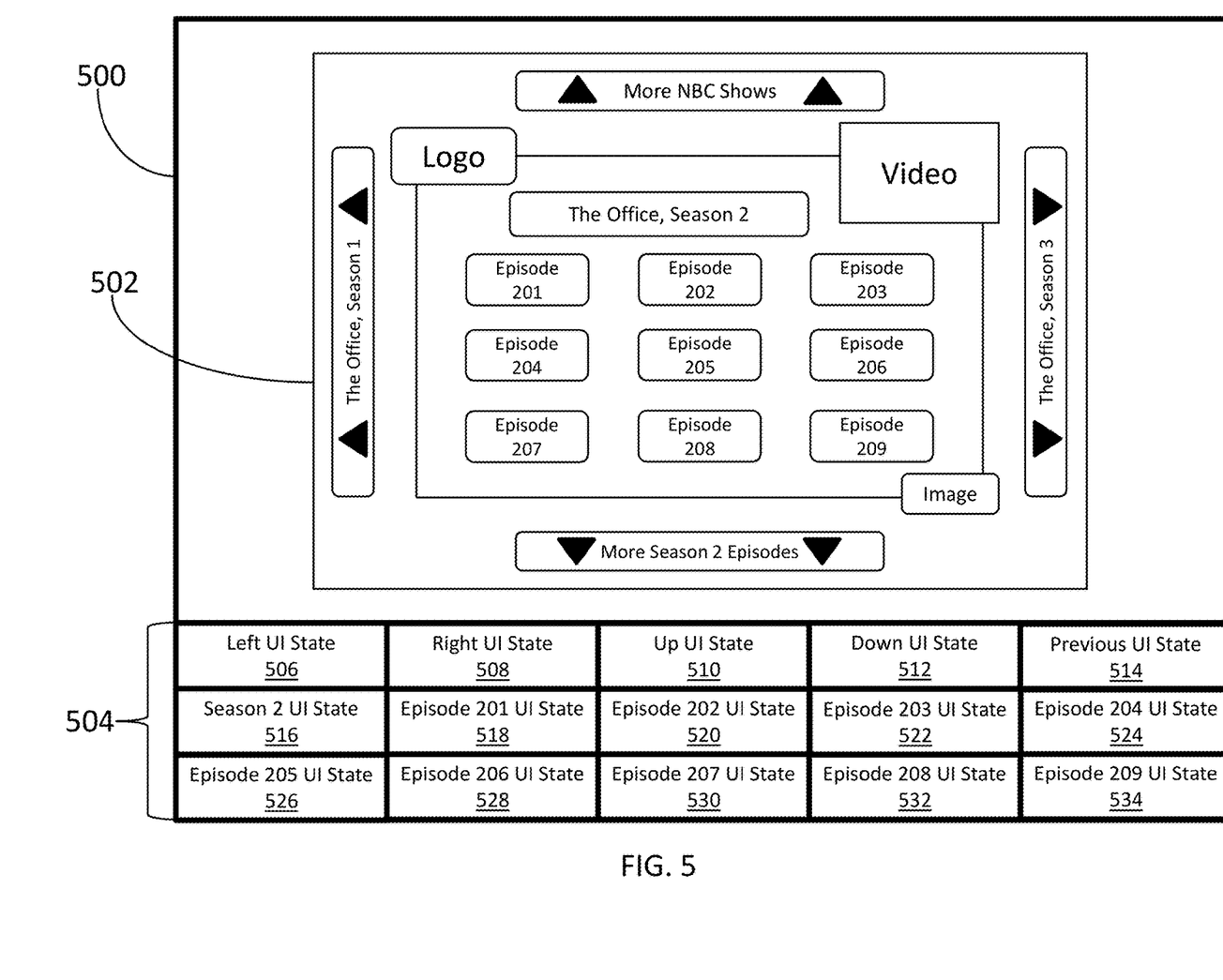
FIG. 5 depicts an illustrative encoded UI state in accordance with one or more aspects of the disclosure.

FIG. 5 depicts an illustrative encoded UI state in accordance with one or more aspects of the disclosure. Referring to FIG. 5, encoded UI state 500 may include one or more UI states encoded, for example, as one or more static images and/or one or more video clips (e.g., Joint Photographic Experts Group (JPEG) images or Moving Picture Experts Group (MPEG) video clips). For example, encoded UI state 500 may include UI state 400 encoded as one or more static images and/or video clips 502. In some embodiments, such images or screens may include one or more blank portions and/or specially encoded portions (e.g., green screens). In such embodiments, images or video distinct from that which is encoded within the images or video (e.g., images or video associated with the encoded UI state (e.g., cover art and/or a preview clip), or video currently being viewed by a user) may be overlaid (e.g., by a user device and/or intermediate node) on the blank and or specially encoded portions to produce a Picture in Picture (PIP) effect. If video clips are utilized, such video clips may be looped or configured to repeat until interrupted by the user and/or a timeout event in order to provide the appearance of a continuous UI state.

Encoded UI state 500 may further include metadata. For example, encoded UI state 500 may include metadata 504. Metadata 504 may include one or more metadata elements associating encoded UI state 500 with one or more other encoded UI states. For example, metadata 504 may include metadata element 506, which may include a pointer to and/or reference for retrieving one or more other encoded UI states, and may indicate the next encoded UI state to display (e.g., an encoded UI state associated with the program group "The Office, Season 1") in response to a user selecting selectable element 428 (e.g., navigating left while viewing encoded UI state 500). Similarly, metadata 504 may include: metadata element 508 associating encoded UI state 500 with an encoded UI state that should be displayed to a user in response to the user selecting selectable element 430 (e.g., an encoded UI state associated with the program group "The Office, Season 3"); metadata element 510 associating encoded UI state 500 with an encoded UI state that should be displayed to a user in response to the user selecting selectable element 432 (e.g., an encoded UI state associated with "More NBC Shows"); metadata element 512 associating encoded UI state 500 with an encoded UI state that should be displayed to a user in response to the user selecting selectable element 434 (e.g., an encoded UI state associated with more episodes of the program group "The Office, Season 2"); metadata element 514 associating encoded UI state 500 with an encoded UI state that should be displayed to a user in response to the user invoking an option (e.g., previous or last) to display a UI state displayed immediately prior to encoded UI state 500; metadata element 516 associating encoded UI state 500 with an encoded UI state that should be displayed to a user in response to the user selecting selectable element 408 (e.g., an encoded UI state associated with the program group "The Office, Season 2"); metadata element 518 associating encoded UI state 500 with an encoded UI state that should be displayed to a user in response to the user selecting selectable element 410 (e.g., an encoded UI state associated with program episode 201 of "The Office, Season 2"); metadata element 520 associating encoded UI state 500 with an encoded UI state that should be displayed to a user in response to the user selecting selectable element 412 (e.g., an encoded UI state associated with program episode 202 of "The Office, Season 2"); metadata element 522 associating encoded UI state 500 with an encoded UI state that should be displayed to a user in response to the user selecting selectable element 414 (e.g., an encoded UI state associated with program episode 203 of "The Office, Season 2"); metadata element 524 associating encoded UI state 500 with an encoded UI state that should be displayed to a user in response to the user selecting selectable element 416 (e.g., an encoded UI state associated with program episode 204 of "The Office, Season 2"); metadata element 526 associating encoded UI state 500 with an encoded UI state that should be displayed to a user in response to the user selecting selectable element 418 (e.g., an encoded UI state associated with program episode 205 of "The Office, Season 2"); metadata element 528 associating encoded UI state 500 with an encoded UI state that should be displayed to a user in response to the user selecting selectable element 420 (e.g., an encoded UI state associated with program episode 206 of "The Office, Season 2"); metadata element 530 associating encoded UI state 500 with an encoded UI state that should be displayed to a user in response to the user selecting selectable element 422 (e.g., an encoded UI state associated with program episode 207 of "The Office, Season 2"); metadata element 532 associating encoded UI state 500 with an encoded UI state that should be displayed to a user in response to the user selecting selectable element 424 (e.g., an encoded UI state associated with program episode 208 of "The Office, Season 2"); and metadata element 534 associating encoded UI state 500 with an encoded UI state that should be displayed to a user in response to the user selecting selectable element 426 (e.g., an encoded UI state associated with program episode 209 of "The Office, Season 2").

Figure 6A:
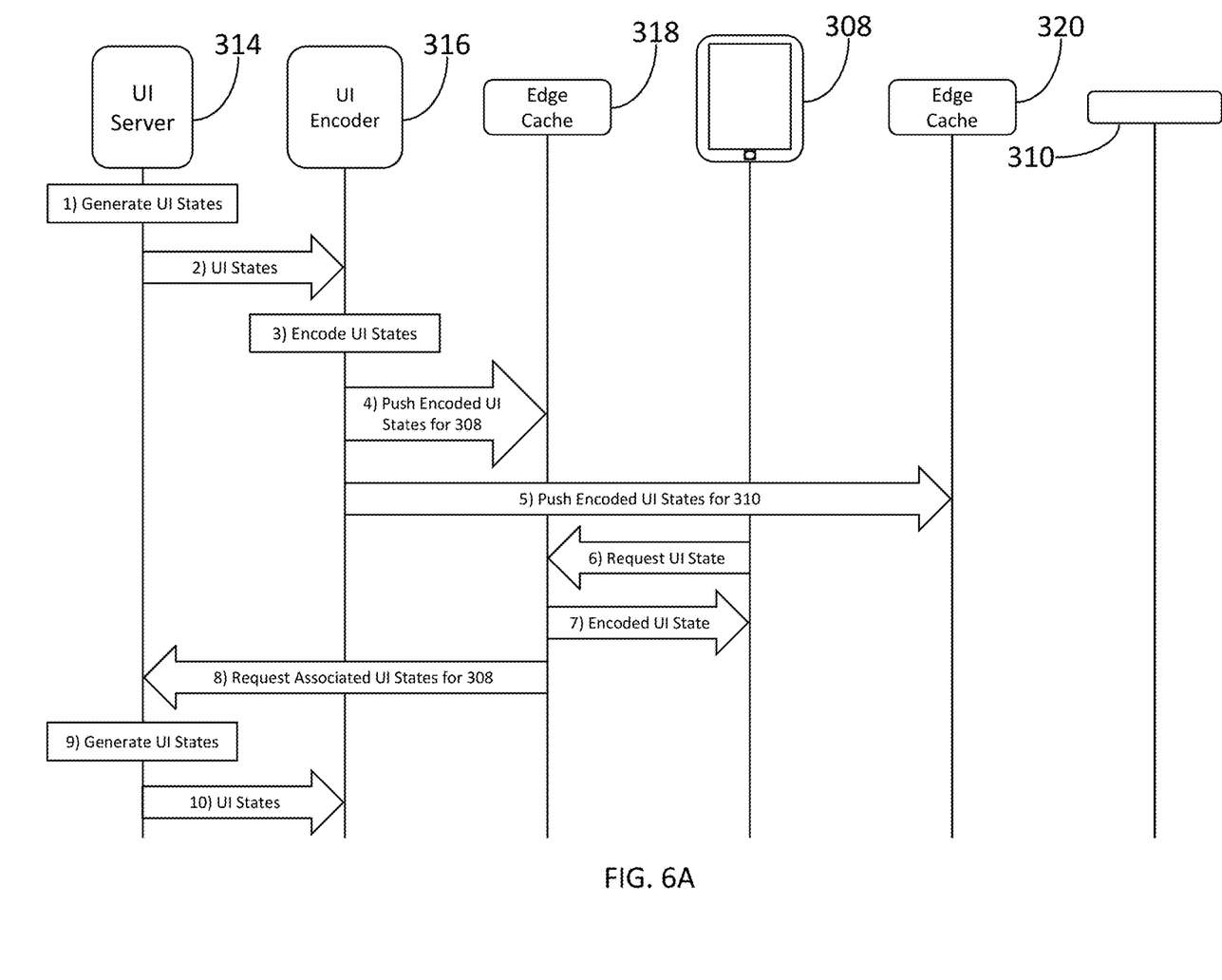
FIGS. 6A, 6B, and 6C depict an illustrative sequence in accordance with one or more aspects of the disclosure.

FIGS. 6A, 6B, and 6C depict an illustrative sequence in accordance with one or more aspects of the disclosure. Referring to FIG. 6A, at step 1, UI server 314 may identify and generate one or more UI states (e.g., UI state 400) prior to the UI state(s) being requested by user device 308 or user device 310. At step 2, UI server 314 may communicate the UI state(s) to UI encoder 316. At step 3, UI encoder 316 may encode the UI state(s) into one or more corresponding encoded UI states (e.g., encoded UI state 500), for example, one or more static images and/or video clips. At step 4, UI encoder 316 may push one or more of the encoded UI states (e.g., encoded UI state 500) to edge cache 318. At step 5, UI encoder 316 may push one or more of the encoded UI states (e.g., encoded UI state 500) to edge cache 320. At step 6, user device 308 may request a UI state (e.g., UI state 400). For example, a user of user device 308 may select a selectable option, from an encoded UI state being displayed by user device 308 (not illustrated), that corresponds to the program group "The Office, Season 2." At step 7, edge cache 318 may communicate encoded UI state 500 to user device 308 in response to user device 308's request. At step 8, edge cache 318 may request one or more additional encoded UI states associated with encoded UI state 500. For example, edge cache 318 may request one or more encoded UI states associated with encoded UI state 500 by metadata 504 (e.g., encoded UI states associated with the program group "The Office, Season 1," the program group "The Office, Season 3," "More NBC Shows," more episodes of the program group "The Office, Season 2," a UI state displayed immediately prior to encoded UI state 500, the program group "The Office, Season 2," program episode 201 of "The Office, Season 2," program episode 202 of "The Office, Season 2," program episode 203 of "The Office, Season 2," program episode 204 of "The Office, Season 2," program episode 205 of "The Office, Season 2," program episode 206 of "The Office, Season 2," program episode 207 of "The Office, Season 2," program episode 208 of "The Office, Season 2," and program episode 209 of "The Office, Season 2").

Figure 6B:
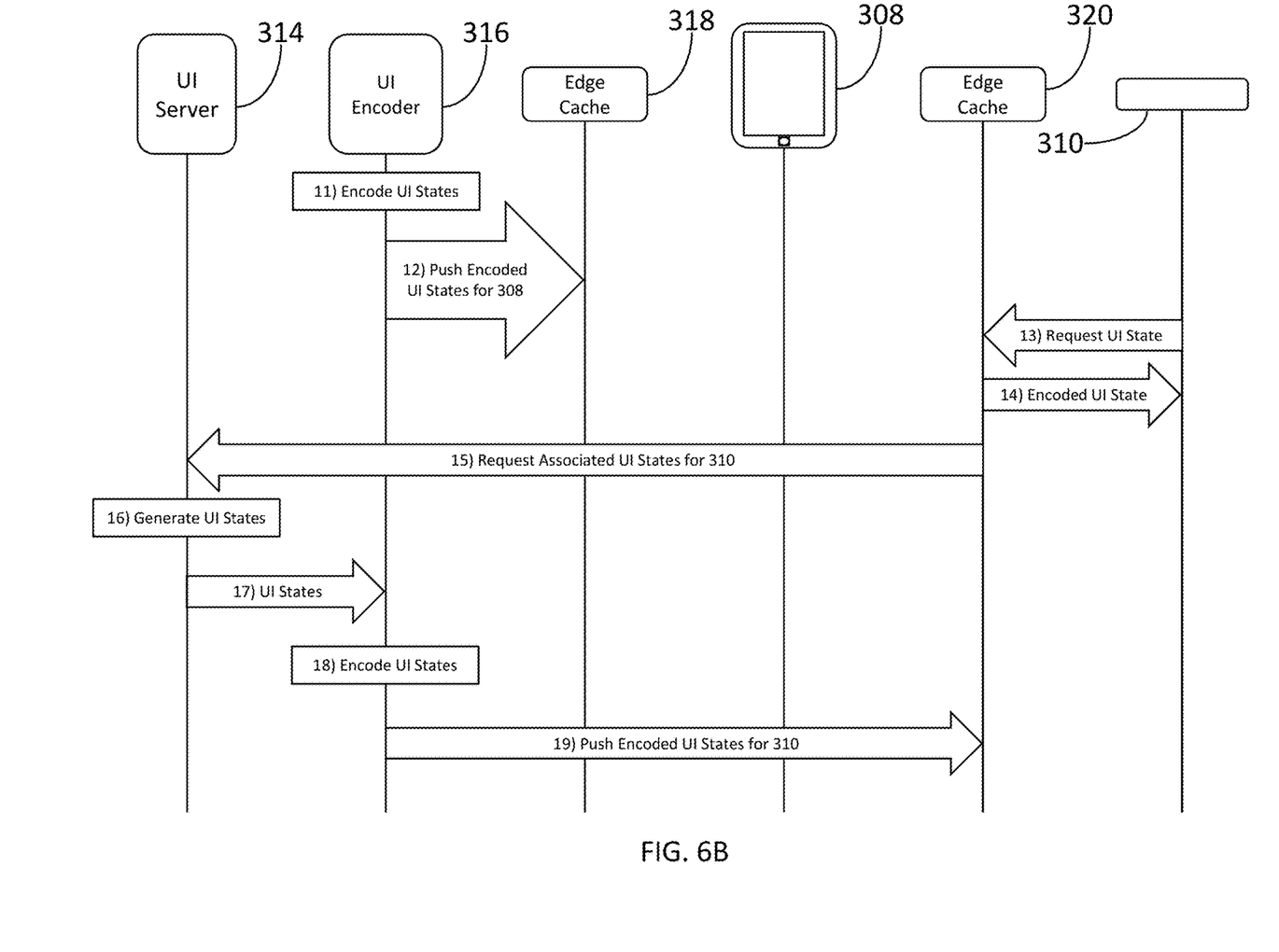

At step 9, UI server 314 may identify and generate one or more UI states corresponding to the additional encoded UI states associated with encoded UI state 500. At step 10, UI server 314 may communicate the one or more UI states corresponding to the additional encoded UI states associated with encoded UI state 500 to UI encoder 316. Referring to FIG. 6B, at step 11, UI encoder 316 may encode the one or more UI states corresponding to the additional encoded UI states associated with encoded UI state 500. At step 12, UI encoder 316 may push the one or more additional encoded UI states associated with encoded UI state 500 to edge cache 318. At step 13, user device 310 may request a UI state (e.g., UI state 400). For example, a user of user device 310 may select a selectable option, from an encoded UI state being displayed by user device 310 (not illustrated), that corresponds to the program group "The Office, Season 2." At step 14, edge cache 320 may communicate encoded UI state 500 to user device 310 in response to user device 310's request. At step 15, edge cache 320 may request one or more additional encoded UI states associated with encoded UI state 500. For example, edge cache 320 may request one or more encoded UI states associated with encoded UI state 500 by metadata 504 (e.g., encoded UI states associated with the program group "The Office, Season 1," the program group "The Office, Season 3," "More NBC Shows," more episodes of the program group "The Office, Season 2," a UI state displayed immediately prior to encoded UI state 500, the program group "The Office, Season 2," program episode 201 of "The Office, Season 2," program episode 202 of "The Office, Season 2," program episode 203 of "The Office, Season 2," program episode 204 of "The Office, Season 2," program episode 205 of "The Office, Season 2," program episode 206 of "The Office, Season 2," program episode 207 of "The Office, Season 2," program episode 208 of "The Office, Season 2," and program episode 209 of "The Office, Season 2").

At step 16, UI server 314 may identify and generate one or more UI states corresponding to the additional encoded UI states associated with encoded UI state 500. At step 17, UI server 314 may communicate the one or more UI states corresponding to the additional encoded UI states associated with encoded UI state 500 to UI encoder 316. At step 18, UI encoder 316 may encode the one or more UI states corresponding to the additional encoded UI states associated with encoded UI state 500. At step 19, UI encoder 316 may push the one or more additional encoded UI states associated with encoded UI state 500 to edge cache 320.

Figure 6C:
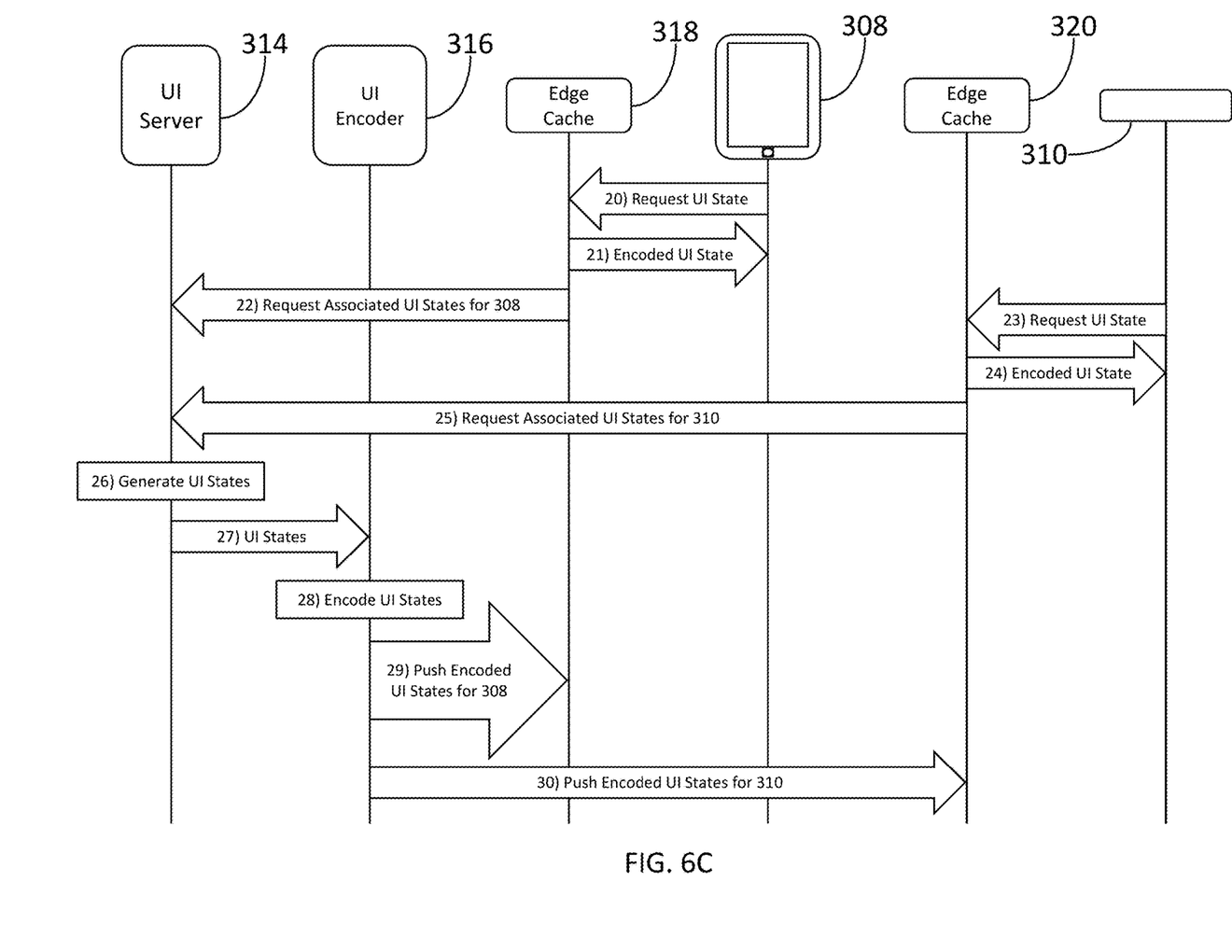

Referring to FIG. 6C, at step 20, user device 308 may request a UI state (e.g., a UI state for the program group "The Office, Season 1"), for example, by selecting selectable element 428 (or navigating left). Additionally or alternatively, a UI state may be requested by one or more network nodes (e.g., a UI navigation server configured to receive communications from user device 308 and/or user device 310 and request one or more UI states on their behalf) on behalf of user device 308 (e.g., in response to a user of user device 308 navigating left, right, up, down, selecting a selectable element, and/or indicating a desire to return to a previously displayed UI state). In some embodiments, a UI state may be requested for user device 308 in response to a UI state being displayed by user device 308 expiring and/or timing out (e.g., becoming outdated). At step 21, edge cache 318 may retrieve the encoded UI state, previously pushed down to it by UI encoder 316, for the program group "The Office, Season 1," and may communicate it to user device 308. At step 22, edge cache 318 may request one or more additional encoded UI states associated with the encoded UI state for the program group "The Office, Season 1." For example, edge cache 318 may request one or more encoded UI states associated with the encoded UI state for the program group "The Office, Season 1" by metadata included within the encoded UI state for the program group "The Office, Season 1." At step 23, user device 310 may request a UI state (e.g., a UI state for the program group "The Office, Season 3"), for example, by selecting selectable element 430 (or navigating right). At step 24, edge cache 320 may retrieve the encoded UI state, previously pushed down to it by UI encoder 316, for the program group "The Office, Season 3," and may communicate it to user device 310. At step 25, edge cache 320 may request one or more additional encoded UI states associated with the encoded UI state for the program group "The Office, Season 3." For example, edge cache 320 may request one or more encoded UI states associated with the encoded UI state for the program group "The Office, Season 3" by metadata included within the encoded UI state for the program group "The Office, Season 3."

At step 26, UI server 314 may identify and generate one or more UI states corresponding to the encoded UI state(s) associated with the encoded UI state for the program group "The Office, Season 1" by metadata included within the encoded UI state for the program group "The Office, Season 1" and one or more UI states corresponding to the encoded UI state(s) associated with the encoded UI state for the program group "The Office, Season 3" by metadata included within the encoded UI state for the program group "The Office, Season 3." At step 27, UI server 314 may communicate the UI state(s) to UI encoder 316. At step 28, UI encoder 316 may encode the UI state(s) into one or more corresponding encoded UI states. At step 29, UI encoder 316 may push one or more of the encoded UI states (e.g., the corresponding encoded UI state(s) associated with the encoded UI state for the program group "The Office, Season 1") to edge cache 318. At step 30, UI encoder 316 may push one or more of the encoded UI states (e.g., the corresponding encoded UI state(s) associated with the encoded UI state for the program group "The Office, Season 3") to edge cache 320.

By requesting the encoded UI states associated with encoded UI state 500 by metadata 504 contemporaneous to delivery of encoded UI state 500 to user devices 308 and 310, edge caches 318 and 320 may more efficiently deliver the UI states for the program group "The Office, Season 1" and the program group "The Office, Season 3" to user devices 308 and 310, respectively. For example, prior to their request, the UI states for the program group "The Office, Season 1" and the program group "The Office, Season 3" may have already been identified and generated by UI server 314, encoded by UI encoder 316, and their corresponding encoded UI states pushed to edge caches 318 and 320. That is, because each encoded UI state is associated with a finite number of other encoded UI states which a user may navigate to, UI states corresponding to these encoded UI states may be identified, generated, and encoded, and the corresponding encoded UI states pushed to edge caches 318 and 320 prior to their request by user device 308 and/or user device 310. As will be described in greater detail below, any number of encoded UI states may be pushed to edge caches 318 and 320 prior to their request, for example, by generating corresponding UI states, encoding the corresponding UI states, and pushing the encoded UI states (e.g., encoded UI states that would be requested if a user navigated to one or more encoded UI states from one or more encoded UI states not currently displayed by user device 308 or user device 310, but that could be requested from an encoded UI state currently displayed by user device 308 or user device 310). Moreover, as will also be described in greater detail below, the depth or volume of encoded UI states to be pushed to edge caches 318 and 320 prior to their request by user device 308 or user device 310 may be an adjustable network parameter that may be pre-determined, (e.g., by one or more operators of provider network 302 and/or access networks 304 and 306) and/or dynamically adjusted (e.g., based on edge cache 318 or edge cache 320's current utilization, and/or network conditions associated with provider network 302, access network 304, or access network 306).

The above embodiments are merely illustrative of one or more implementations of aspects of the disclosure. For example, it will be appreciated that the functionality of UI server 314 and UI encoder 316 may be distributed across multiple devices or combined into a single device. Additionally or alternatively, the functionality of edge caches 318 and 320 may be performed by user devices 308 and 310, respectively (e.g., by caching encoded UI states at user device 308 and/or user device 310). Similarly, the association or interrelationship between encoded UI states may be maintained by and/or obtained from a central repository (e.g., a database) rather than metadata included in the encoded UI states themselves.

Figure 7:
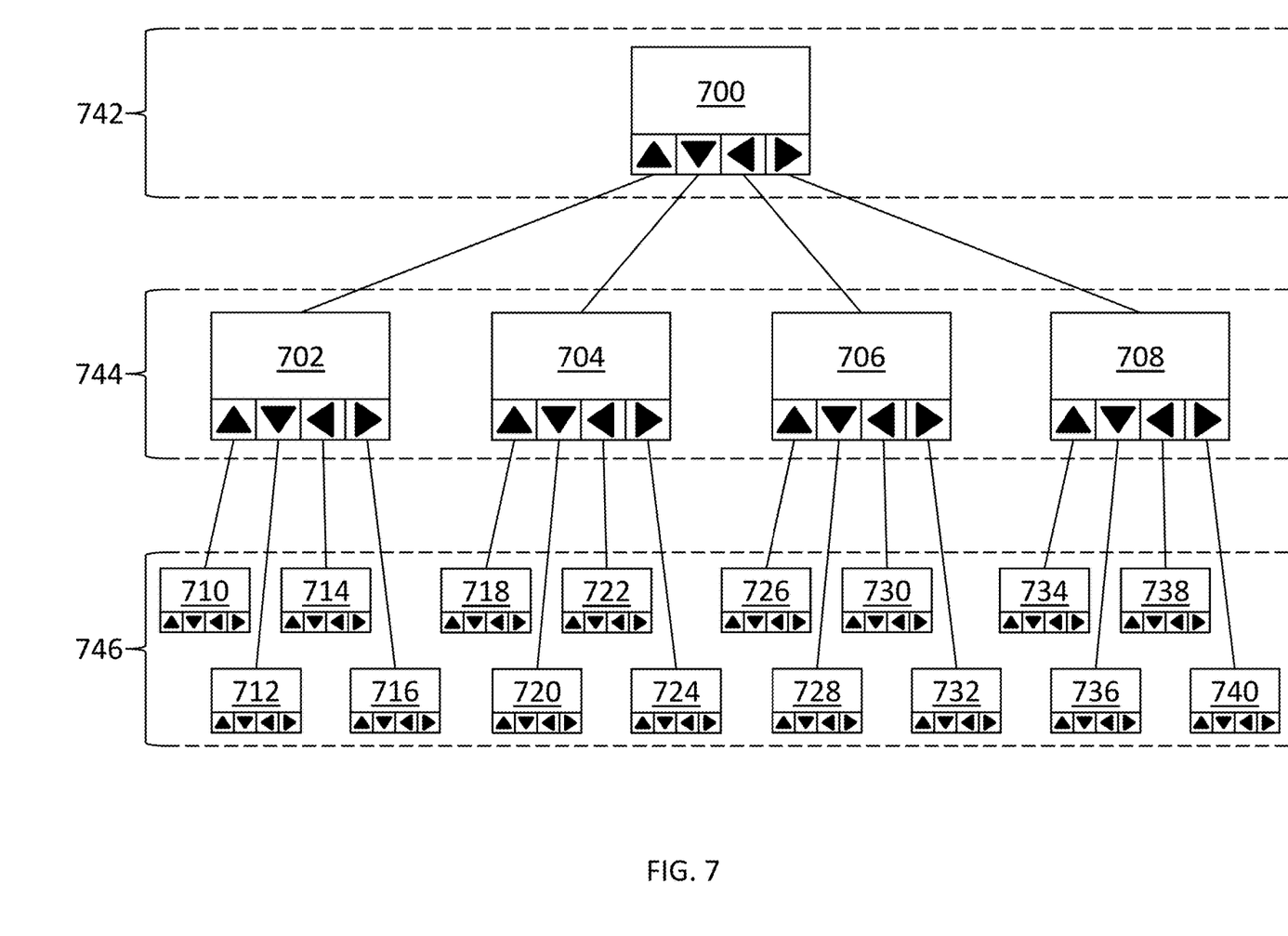
FIG. 7 depicts multiple navigationally related encoded UI states in accordance with one or more aspects of the disclosure.

As indicated above, one or more encoded UI states may be navigationally related to one another. FIG. 7 depicts multiple navigationally related encoded UI states in accordance with one or more aspects of the disclosure. Referring to FIG. 7, one or more of encoded UI states 700, 702, 704, 706, 708, 710, 712, 714, 716, 718, 720, 722, 724, 726, 728, 730, 732, 734, 736, 738, and 740 may be navigationally related to one another. The navigational relationship(s) between one or more of encoded UI states 700, 702, 704, 706, 708, 710, 712, 714, 716, 718, 720, 722, 724, 726, 728, 730, 732, 734, 736, 738, and 740 may classified as direct or indirect. For example, encoded UI state 700 may be directly navigationally related to encoded UI states 702, 704, 706, and 708 because a user may be able to navigate directly from encoded UI state 700 to encoded UI states 702, 704, 706, and 708 by navigating up, down, left, or right, respectively. Similarly, encoded UI state 702 may be directly navigationally related to encoded UI states 710, 712, 714, and 716 because a user may be able to navigate directly from encoded UI state 702 to encoded UI states 710, 712, 714, and 716 by navigating up, down, left, or right, respectively; encoded UI state 704 may be directly navigationally related to encoded UI states 718, 720, 722, and 724 because a user may be able to navigate directly from encoded UI state 704 to encoded UI states 718, 720, 722, and 724 by navigating up, down, left, or right, respectively; encoded UI state 706 may be directly navigationally related to encoded UI states 726, 728, 730, and 732 because a user may be able to navigate directly from encoded UI state 706 to encoded UI states 726, 728, 730, and 732 by navigating up, down, left, or right, respectively; and encoded UI state 708 may be directly navigationally related to encoded UI states 734, 736, 738, and 740 because a user may be able to navigate directly from encoded UI state 708 to encoded UI states 734, 736, 738, and 740 by navigating up, down, left, or right, respectively. Additionally, encoded UI state 700 may be indirectly navigationally related to encoded UI states 710, 712, 714, 716, 718, 720, 722, 724, 726, 728, 730, 732, 734, 736, 738, and 740 because a user may navigate from encoded UI state 700 to any one of encoded UI states 710, 712, 714, 716, 718, 720, 722, 724, 726, 728, 730, 732, 734, 736, 738, and 740 via a directly navigationally related encoded UI state (e.g., encoded UI states 702, 704, 706, or 708) and/or one or more intervening indirectly navigationally related encoded UI state(s) (not illustrated).

It will be appreciated, that one or more encoded UI states may be directly and/or indirectly navigationally related by the ability of a user to navigate from one encoded UI state to another encoded UI state, whether directly or indirectly (e.g., via a directly navigationally related encoded UI state and/or one or more intervening indirectly navigationally related encoded UI state(s)). It will further be appreciated, that while FIG. 7 depicts encoded UI states that are navigationally related due to a user's ability to navigate from one encoded UI state to another encoded UI state by navigating up, down, left, and/or right, the possibility of one or more other user navigations may navigationally relate one or more encoded UI states. For example, the possibility of a user selecting an option on an encoded UI state that navigates to one or more encoded UI states associated with an encoded UI state (e.g., making a selection corresponding to selectable element 408, 410, 412, 414, 416, 418, 420, 422, 424, or 426) and/or the possibility of a user indicating that an encoded UI state displayed immediately preceding the encoded UI state currently displayed should be displayed (e.g., by pressing a last or previous button) may navigationally relate one or more encoded UI states.

The navigational relationship(s) between one or more encoded UI states may be thought of as depths, steps, or levels of navigational relationship. For example, from the perspective of encoded UI state 700, encoded UI state 700 may be classified as within base level 742 of encoded UI state 700's navigational relationships. Similarly, from the perspective of encoded UI state 700, encoded UI states 702, 704, 706, and 708 may be classified as within first level 744 of encoded UI state 700's navigational relationships due to their direct navigational relationship with encoded UI state 700. Additionally, encoded UI states 710, 712, 714, 716, 718, 720, 722, 724, 726, 728, 730, 732, 734, 736, 738, and 740 may be classified as within second level 746 of encoded UI state 700's navigational relationships based on their indirect (one intervening level) relationship with encoded UI state 700. It will be appreciated that an infinite number of relationship levels is possible, with subsequent levels including one or more additional encoded UI states having an increasing number of intervening levels between themselves and encoded UI state 700.

The level of navigational relationship between one or more encoded UI states may be utilized in determining whether or not one or more navigationally related encoded UI states' corresponding UI state(s) should be identified, generated, and/or encoded, and, once encoded, whether or not the navigationally related encoded UI state(s) should be pushed to one or more user devices and/or associated edge caches. For example, the depth of navigationally related encoded UI states whose constituent encoded UI state(s)

should have their corresponding UI state(s) identified, generated, and/or encoded, and, once encoded, pushed to one or more user devices and/or associated edge caches may be based on a network parameter that may be pre-determined and/or adjusted, (e.g., by one or more operators of provider network 302 and/or access networks 304 and 306). For example, if a network operator's primary concern is providing a high quality UI experience to its users, when an encoded UI state is requested, more levels of its navigationally related encoded UI state(s) may have their corresponding UI state(s) identified, generated, and/or encoded, and, once encoded, pushed to one or more user devices and/or associated edge caches. For example, when encoded UI state 700 is requested, such an operator may prefer that encoded UI states 702, 704, 706, 708, 710, 712, 714, 716, 718, 720, 722, 724, 726, 728, 730, 732, 734, 736, 738, and 740 have their corresponding UI state(s) identified, generated, and/or encoded, and, once encoded, pushed to one or more user devices and/or associated edge caches. Conversely, if a network operator's primary concern is conserving resources and/or devoting resources to one or more other aspects of a user's experience, when an encoded UI state is requested, fewer levels of its navigationally related encoded UI state(s) may have their corresponding UI state(s) identified, generated, and/or encoded, and, once encoded, pushed to one or more user devices and/or associated edge caches. For example, when encoded UI state 700 is requested, such an operator may prefer that only encoded UI states 702, 704, 706, and 708 have their corresponding UI state(s) identified, generated, and/or encoded, and, once encoded, pushed to one or more user devices and/or associated edge caches.

As indicated above, in some embodiments, an adjustable network parameter may be used to determine the number and/or number of levels of navigationally related encoded UI states' corresponding UI state(s) that should be identified, generated, and/or encoded, and, once encoded, pushed to one or more user devices and/or associated edge caches. The adjustable network parameter may be dynamically adjusted (e.g., based on one or more edge caches' current utilization, and/or network conditions associated with one or more networks). For example, if edge cache 318's current utilization is relatively low (e.g., compared to a predetermined or dynamically adjusted threshold) and/or access network 304's network conditions are favorable, when encoded UI state 700 is requested from within access network 304, encoded UI states 702, 704, 706, 708, 710, 712, 714, 716, 718, 720, 722, 724, 726, 728, 730, 732, 734, 736, 738, and 740 may have their corresponding UI state(s) identified, generated, and/or encoded, and, once encoded, pushed to edge cache 318. Conversely, if edge cache 320's current utilization is relatively high (e.g., compared to a predetermined or dynamically adjusted threshold) and/or access network 306 is congested, when encoded UI state 700 is requested from within access network 306, only encoded UI states 702, 704, 706, and 708 may have their corresponding UI state(s) identified, generated, and/or encoded, and, once encoded, pushed to edge cache 320.

Other factors associated with network environment 300 may be utilized in determining whether or not one or more navigationally related encoded UI states' corresponding UI state(s) should be identified, generated, and/or encoded, and, once encoded, whether or not the navigationally related encoded UI state(s) should be pushed to one or more user devices and/or associated edge caches. For example, if multiple users associated with one or more common edge caches are simultaneously viewing one or more encoded UI states that are navigationally related by a pre-determined or dynamically adjusted threshold number of levels, more levels of navigationally related encoded UI states' corresponding UI state(s) may be identified, generated, and/or encoded, and, once encoded, pushed to the one or more common edge caches. Additionally, a particular user and/or user device's historical use may be taken into account in determining whether or not one or more navigationally related encoded UI states' corresponding UI state(s) should be identified, generated, and/or encoded, and, once encoded, whether or not the navigationally related encoded UI state(s) should be pushed to one or more user devices and/or associated edge caches. For example, more navigationally related encoded UI states' corresponding UI state(s) may be identified, generated, and/or encoded, and, once encoded, pushed to a user and/or user device with an historically high navigational demand (e.g., a channel surfer). Moreover, the preferences of one or more network operators may be taken into account in determining whether or not one or more navigationally related encoded UI states' corresponding UI state(s) should be identified, generated, and/or encoded, and, once encoded, whether or not the navigationally related encoded UI state(s) should be pushed to one or more user devices and/or associated edge caches. For example, an operator of provider network 302, access network 304, or access network 306 may prefer to identify, generate, and/or encode, and, once encoded, push more levels of navigationally related encoded UI state(s) to one or more user devices and/or associated edge caches during off-peak hours.

Additionally or alternatively, user device 308 and/or user device 310's capabilities may be utilized in determining whether or not one or more navigationally related encoded UI states' corresponding UI state(s) should be identified, generated, and/or encoded, and, once encoded, whether or not the navigationally related encoded UI state(s) should be pushed to one or more user devices and/or associated edge caches. For example, if user device 308 is determined to have limited caching resources available, a relatively small number of encoded UI states may be pushed to user device 308. Whereas, if user device 310 is determined to have substantial caching resources available, a relatively large number of encoded UI states may be pushed to user device 310. Similarly, user device 308 and/or user device 310's capabilities may be utilized in determining how one or more encoded UI states pushed to it should be encoded. For example, if user device 308 is determined to have limited rendering and/or display capabilities, encoded UI states comprising low resolution static images may be pushed to it. Whereas, if user device 310 is determined to have adequate rendering and/or display capabilities, encoded UI states comprising high resolution video clips may be pushed to it.

Figure 8:
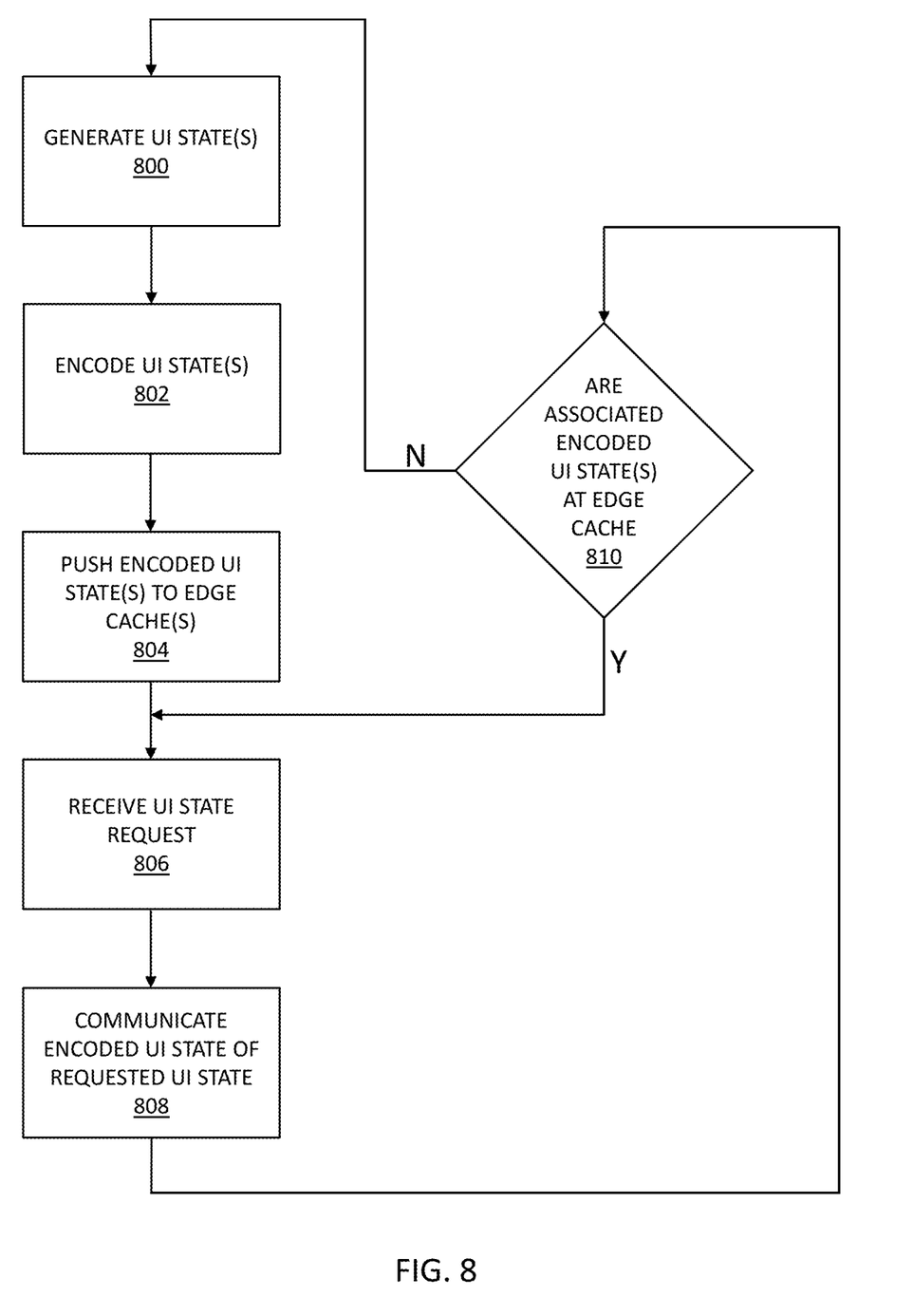
FIG. 8 depicts an illustrative method in accordance with one or more aspects of the disclosure.

FIG. 8 depicts an illustrative method in accordance with one or more aspects of the disclosure. Referring to FIG. 8, at step 800, one or more UI states may be identified and accessed or generated prior to being requested by one or more user devices. For example, UI server 314 may identify and generate UI state 400 prior to UI state 400 being requested by user device 308 or user device 310. At step 802, the one or more UI states may be encoded. For example, UI encoder 316 may encode UI state 400, producing encoded UI state 500. At step 804, the one or more encoded UI states may be pushed to one or more edge caches. For example, encoded UI state 500 may be pushed to edge caches 318 and 320. At step 806, a request for a UI state may be received. For example, edge cache 318 may receive a request for UI state 400 from user device 308. At step 808, an encoded UI state of the requested UI state may be communicated to the requesting user device. For example, encoded UI state 500 may be communicated to user device 308.

At step 810, a determination may be made as to whether one or more encoded UI states associated with the encoded UI state are stored at the edge cache. For example, a determination may be made that one or more encoded UI states associated with encoded UI state 500 (e.g., encoded UI states associated with the program group "The Office, Season 1," the program group "The Office, Season 3," "More NBC Shows," more episodes of the program group "The Office, Season 2," a UI state displayed immediately prior to encoded UI state 500, the program group "The Office, Season 2," program episode 201 of "The Office, Season 2," program episode 202 of "The Office, Season 2," program episode 203 of "The Office, Season 2," program episode 204 of "The Office, Season 2," program episode 205 of "The Office, Season 2," program episode 206 of "The Office, Season 2," program episode 207 of "The Office, Season 2," program episode 208 of "The Office, Season 2," and program episode 209 of "The Office, Season 2") are not stored at edge cache 118. Responsive to determining that the one or more encoded UI states associated with the encoded UI state are not stored at the edge cache, the method may return to step 800, and one or more UI states corresponding to the encoded UI state(s) associated with the encoded UI state may be identified and generated (step 800), encoded (step 802), and the resulting encoded UI state(s) pushed to the edge cache (step 804). For example, one or more UI states corresponding to the encoded UI states associated with encoded UI state 500 may be identified and generated by UI server 314, encoded by UI encoder 316, and the resulting encoded UI states pushed to edge cache 118. Returning to step 810, responsive to determining that the one or more encoded UI states associated with the encoded UI state are stored at the edge cache, the method may return to step 806, and wait for a new UI state request.

The methods and features recited herein may be implemented through any number of computer readable media that are able to store computer readable instructions. Examples of computer readable media that may be used include RAM, ROM, Electrically Erasable Programmable Read-Only Memory (EEPROM), flash memory or other memory technology, CD-ROM, DVD, or other optical disk storage, magnetic cassettes, magnetic tape, magnetic storage, and the like.

Additionally or alternatively, in at least some embodiments, the methods and features recited herein may be implemented through one or more Integrated Circuits (ICs). An IC may, for example, be a microprocessor that accesses programming instructions or other data stored in a ROM. In some embodiments, a ROM may store program instructions that cause an IC to perform operations according to one or more of the methods described herein. In some embodiments, one or more of the methods described herein may be hardwired into an IC. For example, an IC may comprise an Application Specific Integrated Circuit (ASIC) having gates and/or other logic dedicated to the calculations and other operations described herein. In still other embodiments, an IC may perform some operations based on execution of programming instructions read from ROM or RAM, with other operations hardwired into gates or other logic. Further, an IC may be configured to output image data to a display buffer.

Although specific examples of carrying out the disclosure have been described, those skilled in the art will appreciate that there are numerous variations and permutations of the above-described apparatuses and methods that are contained within the spirit and scope of the disclosure as set forth in the appended claims. Additionally, numerous other embodiments, modifications, and variations within the scope and spirit of the appended claims may occur to persons of ordinary skill in the art from a review of this disclosure. Specifically, one or more of the features described herein may be combined with any or all of the other features described herein.

The various features described above are merely non-limiting examples, and may be rearranged, combined, subdivided, omitted, and/or altered in any desired manner. For example, features of the servers may be subdivided among multiple processors and/or computing devices. The true scope of this patent should only be defined by the claims that follow.

What is claimed is:

1. A method, comprising:
  generating, by a computing system, a first plurality of images, each image corresponding to a state of a first plurality of states of a user interface;
  communicating, by the computing system, data comprising the first plurality of images and metadata associating each image of the first plurality of images with a state of the first plurality of states;
  receiving an indication of a request, from a user device, for a first state of the first plurality of states, wherein the indication of the request comprises at least a portion of the metadata;
  in response to the indication of the request for the first state of the first plurality of states, generating, by the computing system, a second plurality of images, each image of the second plurality of images corresponding to a state of a second plurality of states; and
  communicating, by the computing system, data comprising at least one of the second plurality of images.

2. The method of claim 1, wherein the first plurality of images comprises a plurality of static images, and wherein generating the first plurality of images comprises encoding each of the first plurality of states into one or more of the plurality of static images.

3. The method of claim 1, wherein the first plurality of images comprises a plurality of video clips, and wherein generating the first plurality of images comprises encoding each of the first plurality of states into one or more of the plurality of video clips.

4. The method of claim 1, wherein the user interface comprises at least one of a program listing or a program guide, and wherein generating the first plurality of images comprises encoding, for each state of the first plurality of states, an element of the at least one of the program listing or the program guide associated with the respective state.

5. The method of claim 1, wherein communicating the data comprising the first plurality of images comprises communicating one or more images encoding one or more states corresponding to a user of the user device performing at least one of navigating right, navigating left, navigating up, navigating down, selecting an option, or indicating that a state should be redisplayed.

6. The method of claim 1, wherein generating the second plurality of images comprises encoding, prior to the user device requesting a state of the second plurality of states, the second plurality of states.

7. A method, comprising:
  receiving, by a computing system, an indication that a first state of a user interface has expired, wherein the first state of the user interface is associated with a user device;

transmitting, to the user device and in response to receiving the indication that the first state of the user interface has expired, data corresponding to a second state of the user interface; and responsive to receiving the indication that the first state of the user interface has expired and prior to receiving an indication that the user device requested one or more states of the user interface that are navigationally related to the second state, generating one or more images or videos, wherein each of the one or more images or videos corresponds to a state of the user interface that is navigationally related to the second state.

8. The method of claim 7, wherein the second state comprises a user-selectable element and at least one of the one or more images or videos corresponds to the user-selectable element.

9. The method of claim 7, wherein generating the one or more images or videos comprises determining, by the computing system, a number of images or videos to generate.

10. The method of claim 9, wherein determining the number of images or videos to generate comprises determining the number of images or videos to generate based on a capability of the user device.

11. The method of claim 9, wherein determining the number of images or videos to generate further comprises:
determining a first number of states of the user interface that are directly navigationally related to the second state; and
determining a second number of states of the user interface that are indirectly navigationally related to the second state.

12. The method of claim 1, wherein generating the second plurality of images comprises determining, by the computing system, a number of images to generate.

13. The method of claim 12, wherein determining the number of images to generate comprises determining the number of images to generate based on a historical usage associated with the user device.

14. The method of claim 12, wherein determining the number of images to generate comprises determining a number of user devices, associated with an edge cache, that have displayed an image corresponding to the first state.

15. The method of claim 12, wherein determining the number of images to generate comprises:
determining a first number of states of the user interface that are directly navigationally related to the first state; and
determining a second number of states of the user interface that are indirectly navigationally related to the first state.

16. The method of claim 1, wherein:
communicating the data comprising the first plurality of images and the metadata associating each image of the first plurality of images with a state of the first plurality of states comprises communicating the data and the metadata from the computing system and to an edge cache associated with the user device; and
communicating the data comprising at least one of the second plurality of images comprises communicating the data from the computing system and to the edge cache.

17. The method of claim 1, wherein the second plurality of states are navigationally related to the first state.

18. A method comprising:
transmitting, by a first computing device and to a second computing device, a first user interface state;
transmitting, by the first computing device and to a third computing device, a request for a first plurality of user interface states, wherein each state of the first plurality of user interface states is navigationally related to the first user interface state;
determining, by the first computing device, that the first user interface state has expired;
in response to determining that the first user interface state has expired, transmitting, by the first computing device and to the second computing device, a second user interface state of the first plurality of user interface states; and
in response to determining that the first user interface state has expired, transmitting, by the first computing device and to the third computing device, a request for a second plurality of user interface states, wherein each user interface state of the second plurality of user interface states is navigationally related to the second user interface state.

* * * * *